(12) United States Patent
Auten et al.

(10) Patent No.: US 10,047,820 B2
(45) Date of Patent: Aug. 14, 2018

(54) FLUID-FILLED, VIBRATION DAMPING BUSHING ASSEMBLY AND METHOD OF MANUFACTURING THE SAME

(71) Applicant: ANAND NVH PRODUCTS, INC., Novi, MI (US)

(72) Inventors: Jeffrey D Auten, West Bloomfield, MI (US); Robert P Church, Canton, MI (US)

(73) Assignee: Anand NVH Products Inc., Novi, MI (US)

(*) Notice: Subject to any disclaimer, the term of this patent is extended or adjusted under 35 U.S.C. 154(b) by 0 days.

(21) Appl. No.: 15/088,881

(22) Filed: Apr. 1, 2016

(65) Prior Publication Data

US 2016/0298717 A1   Oct. 13, 2016

Related U.S. Application Data

(60) Provisional application No. 62/145,590, filed on Apr. 10, 2015.

(51) Int. Cl.
| | | |
|---|---|---|
| *F16F 13/14* | (2006.01) | |
| *B29C 65/70* | (2006.01) | |
| *F16F 1/38* | (2006.01) | |
| *B29L 31/30* | (2006.01) | |

(52) U.S. Cl.
CPC .......... *F16F 13/1445* (2013.01); *B29C 65/70* (2013.01); *F16F 1/3842* (2013.01); *F16F 13/1454* (2013.01); *B29L 2031/3055* (2013.01)

(58) Field of Classification Search
CPC .... F16F 13/1445; F16F 13/1454; B29C 65/70
USPC ............................ 267/140.11, 140.12, 140.13
See application file for complete search history.

(56) References Cited

U.S. PATENT DOCUMENTS

| | | | |
|---|---|---|---|
| 4,899,997 A | * | 2/1990 | Thorn .................... F16F 13/14 |
| | | | 267/140.12 |
| 4,964,623 A | | 10/1990 | Thom |
| 5,100,114 A | | 3/1992 | Reuter et al. |
| 5,286,011 A | | 2/1994 | Strand |

(Continued)

FOREIGN PATENT DOCUMENTS

JP           2003278823           10/2003

*Primary Examiner* — Thomas J Williams
(74) *Attorney, Agent, or Firm* — Dickinson Wright PLLC

(57) ABSTRACT

A method of manufacturing a fluid-filled, vibration damping bushing assembly, comprising the steps of: Forming, in a first molding step, a bushing member comprising a elastomeric core having an axial bore therethrough, the elastomeric core having a circumferential exterior surface including at least one fluid chamber, the circumferential exterior surface being partially surrounded by a metal cylinder vulcanized to the elastomeric core in the first molding step; reducing the outer diameter of the bushing member following the first molding step; in a subsequent, second molding step, mold-bonding one or more polymer sealing elements to an exterior circumferential surface of the metal cylinder; in a next step, disposing at least one fluid-channel member over a portion of the exterior circumferential surface of the metal cylinder; and providing a fluid in the at least one fluid chamber, and fluidly-sealing the bushing member, the one or more polymer sealing elements, and the at least one fluid-channel member, within a housing.

6 Claims, 3 Drawing Sheets

(56) References Cited

U.S. PATENT DOCUMENTS

| | | | |
|---|---|---|---|
| 5,320,332 A | | 6/1994 | Hamaekers |
| 5,397,112 A | | 3/1995 | Roth et al. |
| 5,657,510 A | * | 8/1997 | Satori .................... F16F 13/14 16/2.2 |
| 6,007,072 A | | 12/1999 | Yoon |
| 6,557,838 B2 | | 5/2003 | Wirges |
| 6,561,501 B2 | | 5/2003 | Bouhier |
| 6,749,186 B2 | | 6/2004 | Hadi et al. |
| 7,219,882 B2 | * | 5/2007 | Kato .................... F16F 13/1463 267/140.12 |
| 7,267,332 B2 | | 9/2007 | Kato et al. |
| 7,703,753 B2 | | 4/2010 | Siemer et al. |
| 8,038,132 B2 | | 10/2011 | Thornhill et al. |
| 8,100,235 B2 | | 1/2012 | Loheide et al. |
| 8,128,075 B2 | | 3/2012 | Kato et al. |
| 2010/0109213 A1 | | 5/2010 | Schnaars et al. |
| 2010/0127441 A1 | | 5/2010 | Honneur et al. |

\* cited by examiner

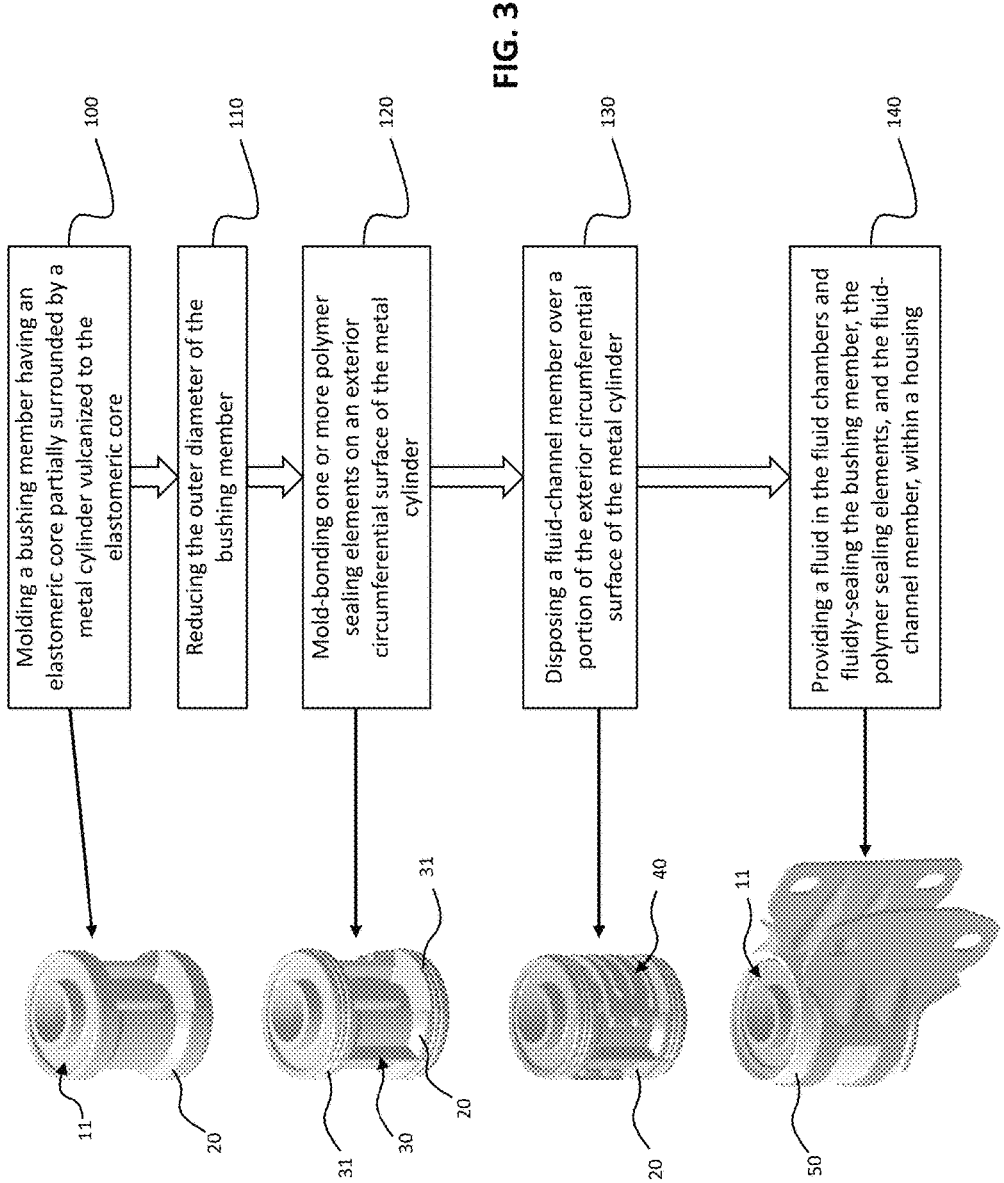

FLUID-FILLED, VIBRATION DAMPING BUSHING ASSEMBLY AND METHOD OF MANUFACTURING THE SAME

CROSS-REFERENCE TO RELATED APPLICATIONS

The present application is related to, and claims the benefit of priority from, United States Provisional Application Ser. No. 62/145,590, filed 10 Apr. 2015, the disclosure of which application is incorporated herein by reference in its entirety.

FIELD OF THE INVENTION

The present invention relates to fluid-filled, vibration damping bushing assemblies and the method of their manufacture.

BACKGROUND

Bushing assemblies are widely used in vehicular transportation such as joints in automobile suspension assemblies. One concern in automobiles is the reduction of vibrations induced from the road surface and isolation of the passenger compartment from such vibrations. Such vibrations may comprise a range of amplitudes and frequencies and motions in various directions. Automotive suspension systems are designed to reduce such vibrations. A front-end suspension system is typically made up of components including various arms, rods, links, etc. intermediate of the frame and the wheel assembly of the car. Generally, an elongated arm extends from the wheel assembly and another arm extends from the frame, the arms connected together at a connecting joint having a bushing assembly.

A common type of vibration-damping bushing assembly is the fluid-filled, rubber bushing assembly. Such bushing assemblies comprise a rubber core at least partially surrounded by a metal cylinder. The core includes fluid chambers which are fluidly isolated from each other about the exterior surface of the metal cylinder by sealing elements. A fluid-channel member positioned over the metal cylinder has channels to permit a damping fluid to pass from one fluid chamber to the other in response to changes in the axial or radial load on the bushing. A housing surrounds and captures the foregoing elements in a fluid-sealed manner to prevent leakage of the damping fluid therefrom.

The above-described bushing assembly is conventionally manufactured by molding, in a single step, the rubber core, metal cylinder, and sealing elements so that the same are vulcanized into a unitary assembly. Following this molding step, the outer diameter of the metal cylinder is decreased by calibration or swedging to relieve internal stress in the bushing material.

SUMMARY OF THE DISCLOSURE

Disclosed is a fluid-filled, vibration damping bushing assembly and method of manufacturing the same. According to the method there is, in a first molding step, formed a bushing member comprising a elastomeric core having an axial bore therethrough. The elastomeric core has a circumferential exterior surface including at least one fluid chamber. The circumferential exterior surface is partially surrounded by a metal cylinder vulcanized to the elastomeric core in the first molding step. Next, the outer diameter of the bushing member is reduced. Subsequently, in a second molding step, one or more polymer sealing elements are mold-bonded to an exterior circumferential surface of the metal cylinder. In a next step, at least one fluid-channel member is disposed over a portion of the exterior circumferential surface of the metal cylinder. Thereafter, a fluid is provided in the at least one fluid-chamber, and the bushing member, the one or more polymer sealing elements, and the at least one fluid-channel member are fluidly-sealed within a housing.

In one embodiment, the step of reducing the outer diameter of the bushing member following the first molding step comprises reducing the outer diameter of the bushing member through calibration or swedging.

In one embodiment of the method, the exterior surface of the metal cylinder is cleaned prior to the second molding step of mold-bonding one or more polymer sealing elements to the exterior circumferential surface of the metal cylinder. Further, subsequent to cleaning the exterior surface of the metal cylinder and prior to the step of mold-bonding the one or more polymer sealing elements to the exterior circumferential surface of the metal cylinder, the exterior circumferential surface may be prepped with an adhesive that facilitates the mold-bonding process. Still further, the one or more polymer sealing elements are made from thermoplastic elastomer.

In one embodiment, the fluid-channel member is made from metal or hard polymer.

BRIEF DESCRIPTION OF THE DRAWINGS

An embodiment will now be described, by way of example only, with reference to the accompanying drawings, wherein:

FIG. 3 depicts the manufacturing steps according to the present invention.

WRITTEN DESCRIPTION

Figure 1:
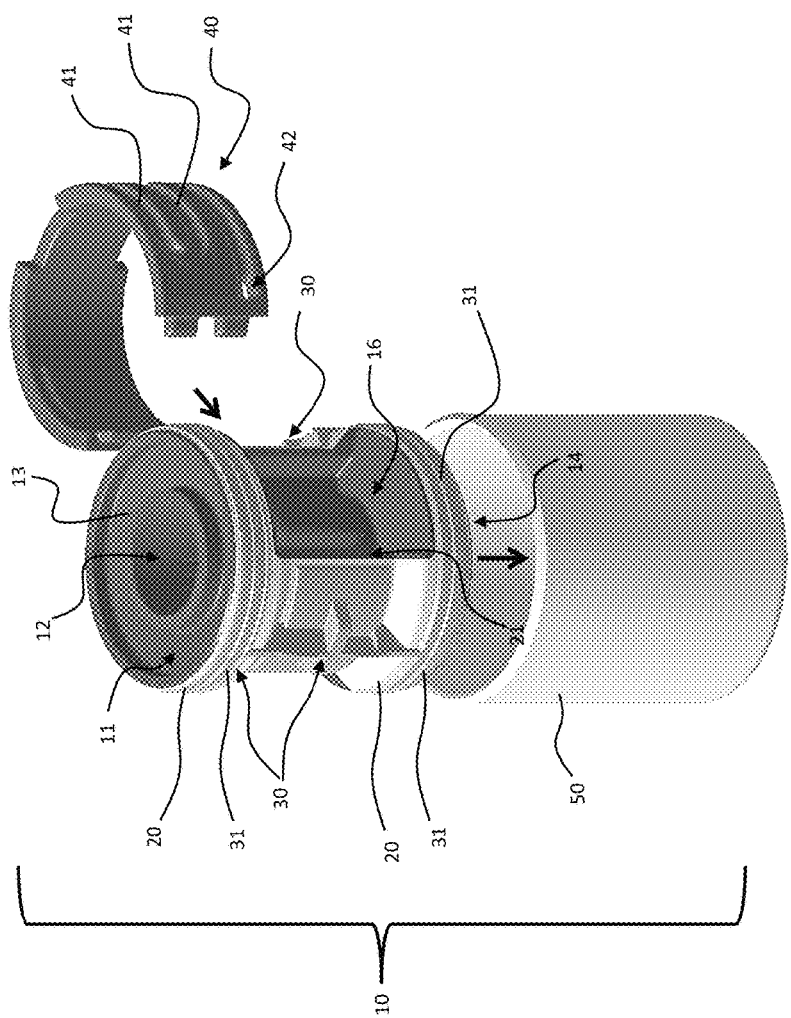
FIG. 1 is an exploded view of a bushing assembly manufactured according to the present invention.
Figure 2:
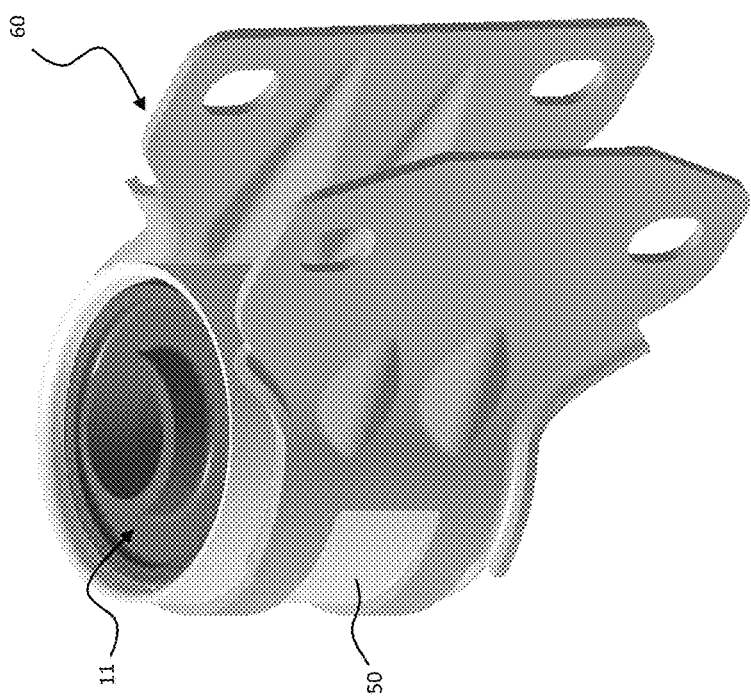
FIG. 2 is a perspective view of the exemplary bushing assembly of FIG. 1, shown in a particular operational embodiment.

Referring now to the drawings, wherein like numerals indicate like or corresponding parts throughout the several views, there is disclosed a method of manufacturing a fluid-filled, vibration damping bushing assembly. As shown in FIGS. 1 and 2, the bushing assembly 10 is generally comprised of a generally cylindrical core 11 of an elastomeric material, such as rubber, partially surrounded by a metal cylinder 20 to define a bushing member. An axial bore 12 extending through the core 11 is, per convention, dimensioned to receive a rod, tube, shaft, etc. (not shown) to connect the bushing assembly 10 to an external structure such as components of a suspension system. Core 11 has opposite first 13 and second 14 end surfaces and a circumferential exterior surface including at least one fluid chamber 16 defined as a recess in the circumferential surface. According to the illustrated embodiment, two such fluid chambers 16 are provided generally opposite each other about the circumferential surface. As depicted, core 11 is, along the principal length thereof, of a smaller diameter than it is proximate the end surfaces 13, 14.

Circumferential exterior surface of the core 11 is partially surrounded by a metal cylinder 20 vulcanized to the core 11 during manufacture of the bushing member. As depicted, metal cylinder 20 includes openings 21 to communicate the fluid chambers 16 with the exterior of the bushing member.

Fluid chambers 16 are fluidly isolated from each other about the exterior surface of the metal cylinder 20 by one or more polymer sealing elements (indicated generally at 30) provided on the exterior surface of metal cylinder 20. Polymer sealing elements 30 include annular portions 31 disposed circumferentially about the metal cylinder 20 proximate each of the end surfaces 13, 14, as shown. As will be appreciated, the dimensions of sealing elements 30 are such that they extend radially beyond the metal cylinder 20 sufficiently so as to be compressed by the housing 50 disposed over the bushing member, the one or more polymer sealing elements 30, and the at least one fluid-channel member 40, as described below.

Positioned over the exterior surface of metal cylinder 20 is at least one fluid-channel member 40. As shown in the exemplary embodiment, fluid-channel member 40 is a semi-cylindrical, generally "c"-shaped element the opposite end portions of which overlie the fluid chambers 16. The exterior surface of fluid-channel member 40 includes channels 41 defining a fluid path to permit a damping fluid (such as, by way of non-limiting example, one or more of oil, water, glycol, hydraulic fluid, etc.) to be within the bushing assembly 10 and pass from one fluid chamber 16 to another in response to changes in the axial or radial load on the bushing and thus provide a hydraulic damping effect. To facilitate such movement, the fluid path includes one or more openings 42 proximate each fluid chamber 16. Fluid-channel member 40 may be made of any suitable material including, for example, a rigid plastic.

As noted above, the bushing member, the one or more polymer sealing elements 30, and the at least one fluid-channel member 40 are captured within a housing 50 comprising, in the illustrated embodiment, a cylindrical member made of metal or other suitable material. As shown, housing 50 is dimensioned so as to extend longitudinally beyond each of the opposite end surfaces 13, 14 of the core 11. The inner diameter of housing 50 is such that sealing elements 30 provide fluid sealing between the bushing member and housing 50 to prevent leakage of the damping fluid disposed therein. As will be understood, the damping fluid is provided in fluid chambers 16 before the he bushing member, the one or more polymer sealing elements 30, and the at least one fluid-channel member 40 are captured within housing 50.

Per convention, the bushing assembly 10 may, optionally, be disposed in a bracket 60 such as shown in FIG. 2, for purposes of mounting the bushing assembly 10 in an operational environment.

Turning now to FIG. 3, the method of manufacturing the above-described exemplary bushing assembly 10 will be better understood.

In a first molding step 100, the bushing member comprising the elastomeric core 11 is molded, in a single step, with metal cylinder 20 vulcanized thereto.

In a subsequent step 110 following vulcanization of the metal cylinder 20 to core 11, the outer diameter of the bushing member is reduced, such as through calibration or swedging to relieve internal stress in the bushing material. According to the bushing assembly of the exemplary embodiment, the outer diameter is swedged approximately 3 mm. However, it will be appreciated that this example is not intended to be limiting of the present invention.

In the next step 120, the sealing elements 30 are mold-bonded to the exterior circumferential surface of the metal cylinder 20. In the exemplary embodiment, the exterior surface of the metal cylinder 20 is first cleaned so as to be free of any impurities that might hamper the mold-bonding step, such as residual polymer from the first molding step. The exterior of the metal surface is then prepped with an adhesive to facilitate the mold-bonding process, per conventional practice. In the exemplary embodiment, the sealing elements 30 are fashioned from a thermoplastic elastomer. However, it will be understood that any other polymer suitable to mold-bonding to the metal cylinder 20, and capable of performing the sealing function of the sealing elements 30, may be substituted.

In the next step 130, the fluid-channel member 40 is disposed over a portion of the exterior circumferential surface of the metal cylinder 20. The fluid-channel member 40 will be understood to be a separately formed (such as by molding, for instance) element which may be manufactured from any suitable material, such as, by way of non-limiting example, metal or a hard polymer (e.g., PA66).

In the final step 140, a suitable fluid (such as, by way of non-limiting example, one or more of oil, water, glycol, hydraulic fluid, etc.) is provided in the one or more fluid chambers 16; and the bushing member (comprising the molded core 11 and metal cylinder 20), the polymer sealing elements 30, and the at least one fluid-channel member 40, are all fluidly sealed within the housing 50.

By the invention as herein described, it will be appreciated that it is possible to manufacture a bushing assembly with improved tolerances and which will demonstrate a longer service life. More particularly, the inventors hereof have discovered that, by forming the bushing member in a first step as hereinabove described, and thereafter calibrating or swedging the bushing member before the sealing elements are provided on the metal cylinder (in the second molding step), the integrity of the sealing elements is not compromised.

Although an exemplary embodiment of the present invention has been described and illustrated, it will be apparent to those skilled in the art that numerous modifications and variations can be made thereto without departing from the scope of the invention as defined in the appended claims.

The invention in which an exclusive property or privilege is claimed is defined as follows:

1. A method of manufacturing a fluid-filled, vibration damping bushing assembly, comprising the steps of: forming, in a first molding step, a bushing member comprising a elastomeric core having an axial bore therethrough, the elastomeric core having a circumferential exterior surface including at least one fluid chamber, the circumferential exterior surface being partially surrounded by a metal cylinder vulcanized to the elastomeric core in the first molding step; reducing the outer diameter of the bushing member following the first molding step; in a subsequent, second molding step, mold-bonding one or more polymer sealing elements to an exterior circumferential surface of the metal cylinder; in a next step, disposing at least one fluid-channel member over a portion of the exterior circumferential surface of the metal cylinder; and providing a fluid in the at least one fluid chamber and fluidly-sealing the bushing member, the one or more polymer sealing elements, and the at least one fluid-channel member, within a housing.

2. The method of claim 1, wherein the step of reducing the outer diameter of the bushing member following the first molding step comprises reducing the outer diameter of the bushing member through calibration or swedging.

3. The method of claim 1, wherein, prior to the second molding step of mold-bonding one or more polymer sealing elements to the exterior circumferential surface of the metal cylinder, the exterior surface of the metal cylinder is cleaned.

4. The method of claim 3, wherein, subsequent to cleaning the exterior surface of the metal cylinder and prior to the step of mold-bonding the one or more polymer sealing elements to the exterior circumferential surface of the metal cylinder, the exterior circumferential surface is prepped with an adhesive that facilitates the mold-bonding process.

5. The method of claim 4, wherein the one or more polymer sealing elements are made from thermoplastic elastomer.

6. The method of claim 1, wherein the fluid-channel member is made from metal or hard polymer.

* * * * *